Aug. 13, 1935.  W. A. KINGSBURY  2,010,865
FRUIT SPLITTER
Filed April 12, 1933   2 Sheets-Sheet 1
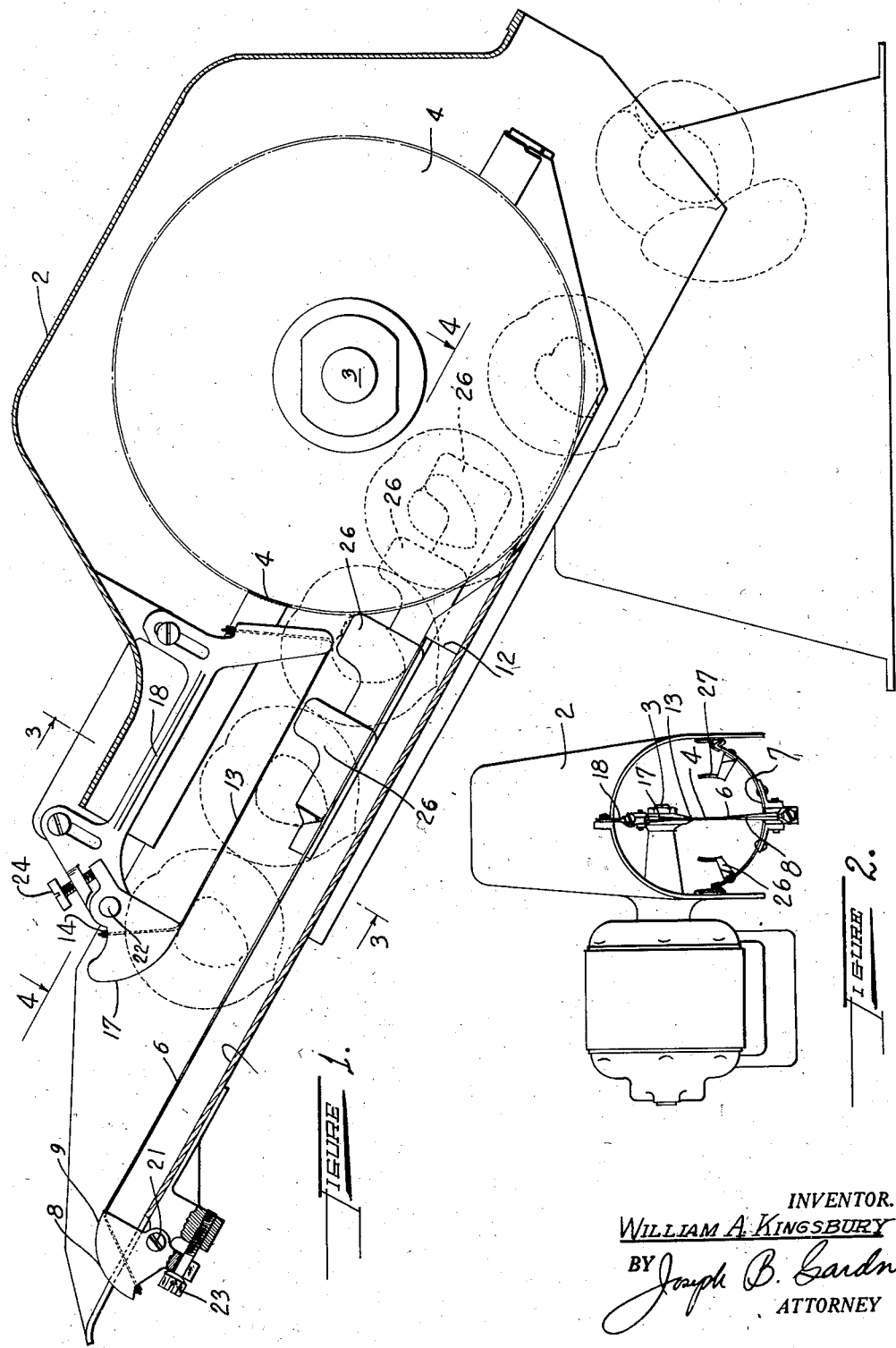
INVENTOR.
WILLIAM A. KINGSBURY
BY Joseph B. Gardner
ATTORNEY

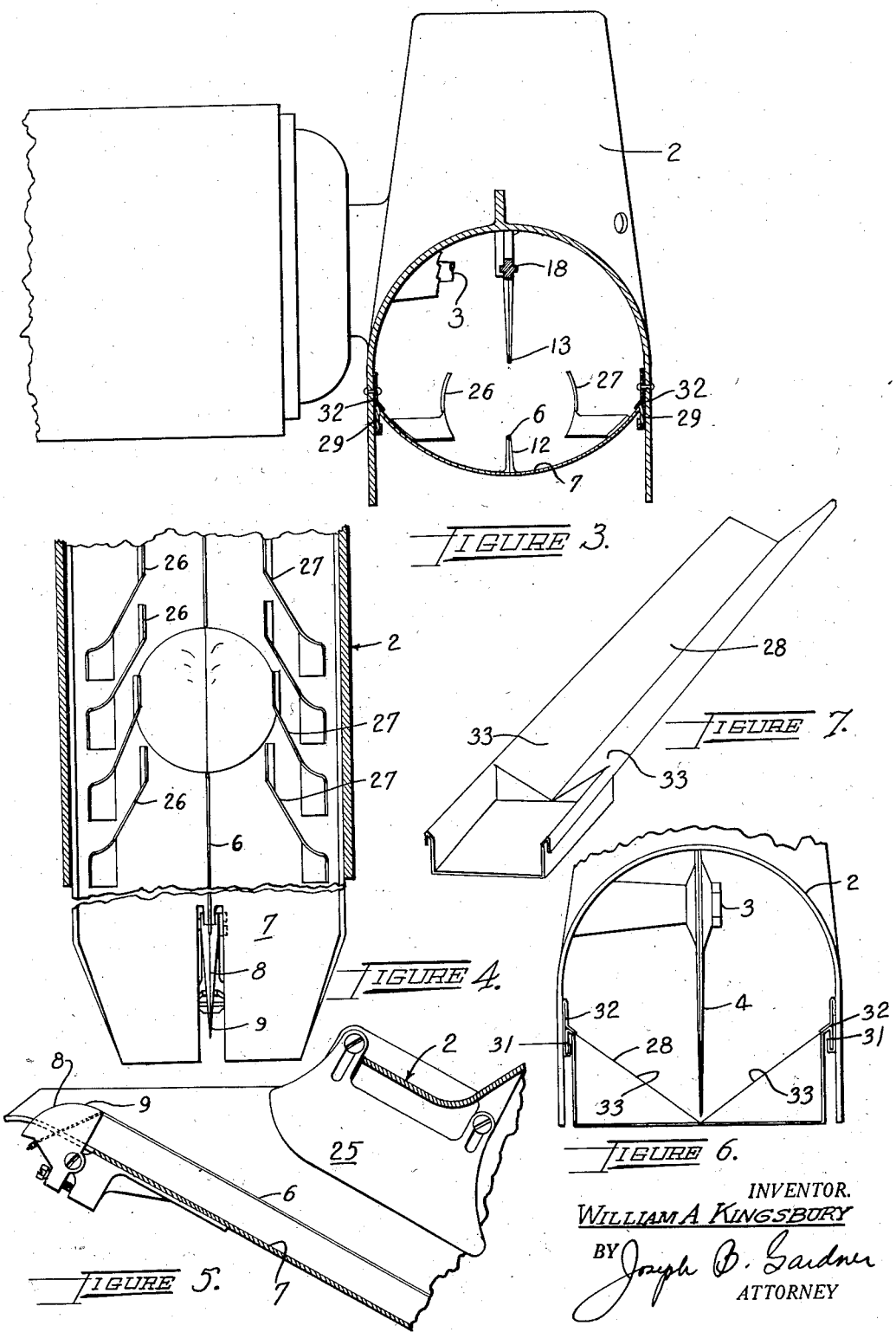

Patented Aug. 13, 1935

2,010,865

UNITED STATES PATENT OFFICE 2,010,865

FRUIT SPLITTER

William A. Kingsbury, Oakland, Calif., assignor to Federal Pitter Company, Vernalis, Calif., a corporation of California Application April 12, 1933, Serial No. 665,678

12 Claims. (Cl. 146—73)

The invention relates to splitting or halving devices for fruit, especially of the drupaceous variety, and particularly to devices of this type in which splitting of the fruit is effected by means of a circular saw or cutter, the fruit being supported during its advance to the cutter and during the splitting operation by guide members which engage in slits cut in the sides of the fruit. More specifically the present invention relates to the fruit guiding and positioning means and to the means for effecting the slits aforesaid.

Heretofore in devices of the character described, the initial slitting of the fruit and the guiding of the fruit to and the holding thereof for operation by the cutter was performed by the use of one and the same means, namely a single pair of transversely spaced knife blades which extended to the cutter and between which the fruit was forcibly inserted so as to cause the blades to enter the fruit and hold and guide same during advance thereof to the cutter. The cutting edges of the blades were sufficiently spaced to clear the stone in the fruit but during the advance of the fruit the stone would invariably bear against one of the edges—and in the case of a large stone frequently against both edges—with the result that such edges became blunt prematurely and required frequent resharpening. Then too, the long cutting edges of the guides made it necessary for the operator to exercise care to avoid contact with such edges when feeding and advancing the fruit by hand.

In view of the above it is one of the objects of my invention to provide a fruit splitter in which the means upon which the fruit is guided to the cutter has entirely eliminated therefrom any cutting edges.

Another object of the invention is to provide a fruit splitter of the character described in which the initial slitting of the fruit is effected by means independent of the means upon which the fruit is advanced or guided to the cutter.

A further object of the invention is to so arrange and position the initial slitting means that there will be no danger of the operator coming in contact therewith while advancing the fruit on the guiding means by hand.

A still further object of the invention is to so form the guiding means that no damage will be inflicted thereon by the incessant contact of the fruit stones therewith or by the passage through said means of stones of abnormal size.

Yet another object of the invention is to provide a splitter of the character described which may be readily converted for handling fruit of different size and character.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side view of the splitter with the enclosing housing shown in cross-section.

Figure 2 is a front end view of the splitter looking straight along the guideway.

Figure 3 is a transverse sectional view of the device taken on the line 3—3 of Figure 1.

Figure 4 is a longitudinal sectional view of a portion of the device taken on the line 4—4 of Figure 1.

Figure 5 is a sectional elevation of a modified form of the device.

Figure 6 is a front end view of the device as adapted for handling fruit without stones.

Figure 7 is a perspective view of the supporting and guiding member used in the embodiment illustrated in Figure 6.

As illustrated in the drawings, the fruit splitter of my invention comprises a housing 2 which in the present embodiment serves as a frame for the device and is supported about a motor shaft 3 about which it may be rotatably shifted to incline the device at any desired angle. Upon the shaft 3 is fixed a saw or disc cutter 4 and it is to the latter that the fruit is arranged to be guided for effecting the halving or splitting thereof.

The device as illustrated in Figures 1 to 5 is adapted for splitting into separate halves, fruit of the drupaceous species, that is, fruit with stones therein, and particularly peaches. As previously explained, in devices of this type the fruit is advanced toward the cutter while slidably supported but interlockingly held on guiding means and such means in the present form of the invention comprises a wire 6 preferably extending generally tangentially of the cutter and spaced from the bottom plate 7 of the housing. The wire 6 is arranged to engage within a slit in the peach and serve as a bearing for the stone during the advance of the peach to the cutter, the slit being formed in the pulp of the peach by means of a knife blade 8 against which the peach is forcibly pressed as it is started on its way through the machine. The blade 8 may be entirely separate of the wire but as here shown is connected thereto and provides a convenient anchor for the forward end of the wire. It will be evident that after the slit is formed and the forward movement of the peach is continued the peach will move off the slitter blade and move upon the wire, the cutting edge 9 of the blade extending upwardly to a point in alignment with the wire so that the peach may continue in a straight path from the blade to the wire. The wire extends inwardly to adjacent the rotary cutter and it is secured thereat to a post 12 which is of narrow cross-section so as not to interfere with movement of the peach from off the wire.

In addition to the wire 6, the guiding means includes a second wire 13 which is spaced above the wire 6 and preferably extends parallel thereto. The wire 13 is spaced from the wire 6 a distance approximately equal to the thickness of the stones of the peaches to be run through the machine, and while the inner end of the wire 13 extends to the cutter, the outer end 14 thereof lies considerably inward of the corresponding end of the wire 6. In a manner similar to the wire 6, the wire 13 has positioned adjacent the outer end thereof a slitter blade 17 against which the upper portion of the peach is pressed as the latter advances through the machine while guided on the lower wire 6. The relationship in the positioning and arrangement of the blade 17 and wire 13 is substantially the same as for the blade 8 and wire 6, so that the peach will move from off blade 17 directly and smoothly onto the wire 13.

Preferably the wire 13 is carried together with the blade 17 in a support 18 which is adjustable transversely of the line of movement of the fruit in order that the spacing between the wires 6 and 13 may be varied in accordance with the general size of the fruit to be handled. Any suitable means may be provided for effecting the desired degree of tautness of the wires. In the present embodiment of the invention, since the blades are secured directly to the wires, the former are adjustably positioned whereby the tightness of the wires may be varied. As here shown the blades 8 and 17 are mounted for rotation on pins 21 and 22 respectively, and rotation of the blades against the resistance of the wires may be effected by means of screws 23 and 24.

In running a peach through the machine it is first moved forwardly against the slitter blade 8 while preferably resting on the bottom plate 7. Then when the slit is formed in the lower portion of the fruit, the peach is advanced so that it leaves the blade and at the same time the pulp surface defining the sides of the slit becomes engaged with the guide wire 6. Since the cutting edge 9 of the blade extends sufficiently high above the bottom plate to effect a slit substantially up to the under side of the stone, the stone when advanced from the blade will bear and ride directly upon the wire whereby a firm support will be provided for the peach for its passage to the splitter. As the advance of the peach continues it is forced against the slitter blade 17 and a slit is formed in the upper portion of the peach, preferably like in the lower side thereof whereby upon the further advance of the peach the wire 13 will become engaged with both the pulp and stone of the peach and an effective interlock of the peach in the guide means will be accomplished. It will be evident that with the stone thus engaged with the guide means, there will be insured the smooth passage of the peach over the guide means and the peach will be firmly held and gripped in position while moving. At the same time there will be no appreciable wear or blunting of the slitting means, and furthermore should a peach with an oversize stone find its way between the guide wires, the latter will readily flex and permit the advance of the peach without injury to the guide means or interference with the effective advance of the other peaches likewise moving through the machine.

A feature of considerable importance in the arrangement of my invention is that the operator does not have to insert and move the fruit between two opposed cutting edges at one time. Thus in my device, when the peach is moved over the lower slitting blade, there is no blade over the top of the peach, and conversely when the peach is being moved under the upper slitting blade there is nothing but the guide wire 6 thereunder. This feature of safety also characterizes the device even when the upper slitter and guide takes the form of a single blade 25 as indicated in the modified form of the device illustrated in Figure 5.

Since the severing of the peach is arranged to be accomplished by completing the cutting started by the slitting aforesaid, it is necessary that the peach be released from the guides when the rotary cutter or saw is cutting through the peach. For this reason there are provided in the guideway a plurality of resilient arms 26 and 27 fixed to the bottom plate 7 and arranged at their free ends to engage the opposite sides of the peach as the latter approaches the cutter disc and moves out of engagement with the guides. The resilient arms are so positioned that they will remain in engagement with the peach and hold same firmly supported until the peach is completely split in half by the cutter. Release of the split sections from engagement with the arms is accomplished by the thrust of the oncoming fruit against said sections.

Preferably the bottom plate 7 of the housing is formed as a detachable section. In this way the plate, together with the arms 26 and 27, the lower slitter and guide wire, may be removed as a unit from the machine for cleaning or the like. Or, if desired, there may in place thereof be readily substituted a unit 28 such as shown in Figures 6 and 7 whereby the machine may be used for handling other forms of fruit. As here shown the manner of attachment of the plate 7 and the unit 28 to the housing is by means of flanges 29 and 31 respectively, which are arranged to engage in channels 32 provided in the housing at opposite sides of the guideway, the coacting parts being placed in or released from engagement by sliding the units into or out of the housing from the feed end thereof. The unit 28 has omitted therefrom the slitter and guide wire, and is particularly adapted for use in splitting fruit without stones, such as pears, the fruit being merely advanced along the V-shaped sides 33 of the unit until the rotary disc is reached and the fruit split in half thereby.

I claim:

1. In a machine for splitting drupaceous fruit, fruit slitting means comprising a knife blade, means for severing the fruit at the slit formed by said first means, and means for guiding the fruit from the first to the second means comprising a member interposed between said first and second means and engageable in the slit aforesaid and being flexible over its length to permit expansion from the stone of the fruit on advance of the fruit from the one means to the other to provide an automatic adjustment of the guide means for accommodating fruit of various sized stones.

2. In a machine for splitting drupaceous fruits, a stationary inflexible cutter for slitting fruit to the stone thereof, a fruit severing cutter, and a member for guiding the fruit from the first to second mentioned cutter arranged to engage within the slit formed in the fruit by the first cutter and against the stone and to position the fruit for severing by the second cutter through said slit and being flexible intermediate the ends thereof to permit expansion from the stone to afford precise guiding thereby of fruits of various sized stones.

3. In a machine for splitting drupaceous fruit, a slitter for the fruit pulp at one end, a splitter for the fruit stone at the other end, and a wire guide extending substantially from the one cutter to the other and arranged to serve as a yieldable bearing for the stone when the fruit is moved thereover from the first to the second cutter.

4. In a machine for splitting drupaceous fruit, a slitter for the fruit pulp, a splitter for the fruit stone spaced from said slitter, a guide wire arranged for engagement with the pulp of the fruit on advance of the fruit to the splitter and designed to serve during such advance movement as a yieldable bearing for the stone and automatically flexing for different sized stones, the upper extremity of the cutting edge of said slitter being substantially flush with the upper surface of the guide wire.

5. In a machine for splitting drupaceous fruit, opposed slitter members for the fruit pulp, stone splitting means spaced from said slitter members, guide members extending substantially from the slitter to the splitter means and arranged to engage in the slit formed by said slitter members and provide a bearing for the stone, one of said guide members being flexible and comprising a wire stretched substantially between said slitter and splitter means and arranged to flex automatically to uniformly bear on various sized stones.

6. In a machine for splitting drupaceous fruit, a rotary cutter for splitting the fruit stone, and a taut wire extending substantially tangentially of said cutter and arranged for engagement with and to serve as a yieldable bearing for the fruit pulp and stone for advance of the fruit to the cutter.

7. In a machine for splitting drupaceous fruit, means to split the fruit stone with the fruit pulp thereon, transversely spaced guide members flexible over their length and being arranged to engage on opposite sides of the stone and resiliently oppose transverse enlargement of the space between the members, and means resiliently engageable with the sides of the fruit to support the latter during the splitting operation by said first means.

8. In a machine for splitting drupaceous fruit, a rotary cutter for splitting the fruit stone with the pulp thereon, a pulp slitter for one side of the fruit spaced from said splitting means, a yielding guide member extending from the slitter to the splitter means and engageable with the pulp and stone of the fruit, a pulp slitter for the opposite side of the fruit positioned inwardly of the end of the guide member adjacent the first slitter, a guide means for the fruit extending from the second slitter to the splitter means, and means arranged to resiliently engage the sides of the fruit when positioned for splitting by the cutter.

9. In a machine for splitting fruit, a fruit splitting cutter, a frame having a fixed portion and removable portion providing a guideway for the advance of fruit to the cutter, slitter and guide members carried by said removable portion, slitter and guide portions carried by said fixed portion for cooperation with said members, and means carried by said removable portion for resiliently holding the fruit for splitting by the cutter, said removable frame portion being, together with said members and last mentioned means as a unit, removable from or replaceable in the fixed frame portion.

10. In a machine for splitting drupaceous fruit, a pair of oppositely disposed arcuate cutting blades arranged to cut through the pulp to adjacent the stone on opposite sides of the fruit, a pair of guide wires affixed to and tangentially extending in parallel relation from said blades for engaging in the slits cut by said blades, and a rotary cutter adjacent the other ends of the wires for splitting said stone.

11. In a machine for splitting drupaceous fruit, a cutter for splitting the fruit, a pair of guide wires extending thereto and arranged for engagement with the fruit pulp and stone for advancement of the fruit to the cutter, and supports tautly drawing said wires from adjacent their ends so as to permit flexing of the wires over their length to and from each other to provide a yieldable bearing for said fruit.

12. In a machine for splitting drupaceous fruit, a cutter for splitting the fruit, a pair of guide wires extending thereto and arranged for engagement with the fruit pulp and stone for advancement of the fruit to the cutter, and supports tautly drawing said wires from adjacent their ends so as to permit flexing of the wires over their length to and from each other to provide a yieldable bearing for said fruit said supports being longitudinally spaced from each other so as to afford widening of the space between the wires at any point over the length of the wires.

WILLIAM A. KINGSBURY.